United States Patent [19]

Yoo

[11] Patent Number: 6,151,027
[45] Date of Patent: Nov. 21, 2000

[54] METHOD OF CONTROLLING USERS IN MULTI-USER VIRTUAL SPACE AND MULTI-USER VIRTUAL SPACE SYSTEM

[75] Inventor: Hyun-suk Yoo, Seoul, Rep. of Korea

[73] Assignee: Samsung Electronics Co., Ltd., Kyungki-do, Rep. of Korea

[21] Appl. No.: 09/039,558

[22] Filed: Mar. 16, 1998

[30]    Foreign Application Priority Data

Jul. 15, 1997 [KR]    Rep. of Korea ............... 97-32937

[51] Int. Cl.[7] .................................... G06T 15/00
[52] U.S. Cl. ................... 345/423; 345/438; 345/329; 345/335; 345/502; 345/504; 345/505
[58] Field of Search .................... 345/419, 423, 345/438, 329, 335, 502, 504, 505

[56]             References Cited

U.S. PATENT DOCUMENTS

| 5,950,202 | 7/1999 | Durward et al. | 345/329 |
| 5,956,028 | 7/1999 | Matsui et al. | 345/329 |

FOREIGN PATENT DOCUMENTS

| 9-81495 | 3/1997 | Japan | G06F 13/00 |

*Primary Examiner*—Mark K. Zimmerman
*Assistant Examiner*—Kimbinh T. Nguyen
*Attorney, Agent, or Firm*—Sughrue, Mion, Zinn, Macpeak & Seas, PLLC

[57]             ABSTRACT

A method of controlling users in a multi-user virtual space and a system for controlling users in a multi-user virtual space. The method includes the steps of: a) connecting lines formed by vertically and equally dividing lines obtained by connecting fixed points, which are center points of fixed objects in a three-dimensional virtual space, to partition the space into sub-spaces; b) calculating the distance between the position of a new user and fixed points of each partitioned sub-space and distributing the new user to the partitioned sub-space having the shortest distance; c) checking and controlling positions, movement and rotation information of each user; and d) repeatedly checking whether there is a new user, and repeating steps b) and c) when there is a new user. Accordingly, the three-dimensional virtual space is partitioned around a fixed point irregularly arranged in the virtual space, and users are assigned to a sub-space and a server according to the distance between the fixed point and the user. Therefore, when users move, the amount of calculation required to determine activities such as whether collisions have occupied is reduced and at the same time more users can take part in the system.

4 Claims, 2 Drawing Sheets

○ : BUILDING
× : USER

METHOD OF CONTROLLING USERS IN MULTI-USER VIRTUAL SPACE AND MULTI-USER VIRTUAL SPACE SYSTEM

BACKGROUND OF THE INVENTION

1. Field of the Invention

The present invention relates to a method of controlling users in a multi-user virtual space and a multi-user virtual space system, and more particularly, to a method and a system for partitioning the multi-user virtual space around a fixed point to control users in the virtual space.

2. Description of the Related Art

In general, a server for controlling a three-dimensional virtual world, and users thereof, is required to enable multiple users to interact on a network in a three-dimensional virtual space. In particular, the three-dimensional virtual space requires the operation to be more than a two-dimensional graphics environment.

A multi-user virtual reality service is composed of user client software and server software. Users can navigate a three-dimensional environment and commonly interact with other users. The server transmits information on the state of the three-dimensional environment and the position and orientation of users to individual users.

To control the server three-dimensional information, the conventional three-dimensional virtual space is divided into a hexahedral lattice or a "hornet's nest" shape. In addition, interactions such as collisions of a building fixed in the divided virtual space with the user navigating the virtual space or of the users are calculated. The calculated interaction information is transmitted to all users navigating the virtual space through the server.

Typical three-dimensional virtual space buildings are irregularly arranged. FIG. 1 shows a conventional three-dimensional virtual space divided in the hexahedral lattice shape. Referring to FIG. 1, the space is divided into blocks of a predetermined size and there are servers for controlling each of the divided blocks. However, when a building 'o' is located at the boundary between the blocks, it is difficult to determine the server for controlling the building. Also, the process of calculating collisions of irregularly located buildings with moving users 'x' is complicated.

SUMMARY OF THE INVENTION

It is an object of the present invention to provide a method of controlling users in a multi-user virtual space in which a three dimensional virtual space is partitioned around fixed buildings and users are allocated to the divided spaces closest to the user, thereby reducing the amount of time required to calculate interactions such as whether there are collisions with users, and a multi-user virtual space system utilizing the above method.

A method of controlling users in a multi-user virtual space that achieves the above object of the present invention, includes the steps of:

a) connecting lines formed by vertically and equally dividing lines obtained by connecting fixed points, which are center points of fixed objects in a three-dimensional virtual space, to partition the space into sub-spaces;

b) calculating the distance between the position of a new user and fixed points of each partitioned sub-space and distributing the new user to the partitioned sub-space having the shortest distance;

c) checking and controlling positions, movement and rotation information of each user; and d) repeatedly checking whether there is a new user, and repeating steps b) and c) when there is a new user.

Also, a system for controlling users in a multi-user virtual space includes:

a host server for partitioning the multi-user virtual space around a fixed point and controlling the partitioned sub-spaces, and calculating distances between the position of a new user and the fixed points, to distribute the new user to the sub-space having the shortest distance; and a plurality of sub-servers for controlling users taking part in the virtual spaces divided by the host server.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Figure 1:
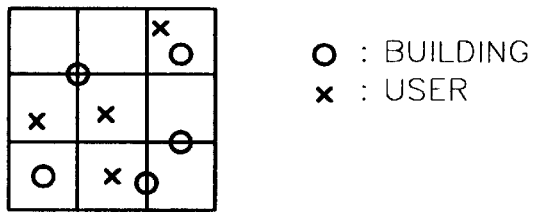
FIG. 1 shows a conventional three-dimensional virtual space divided in a hexahedral lattice shape.
Figure 2:
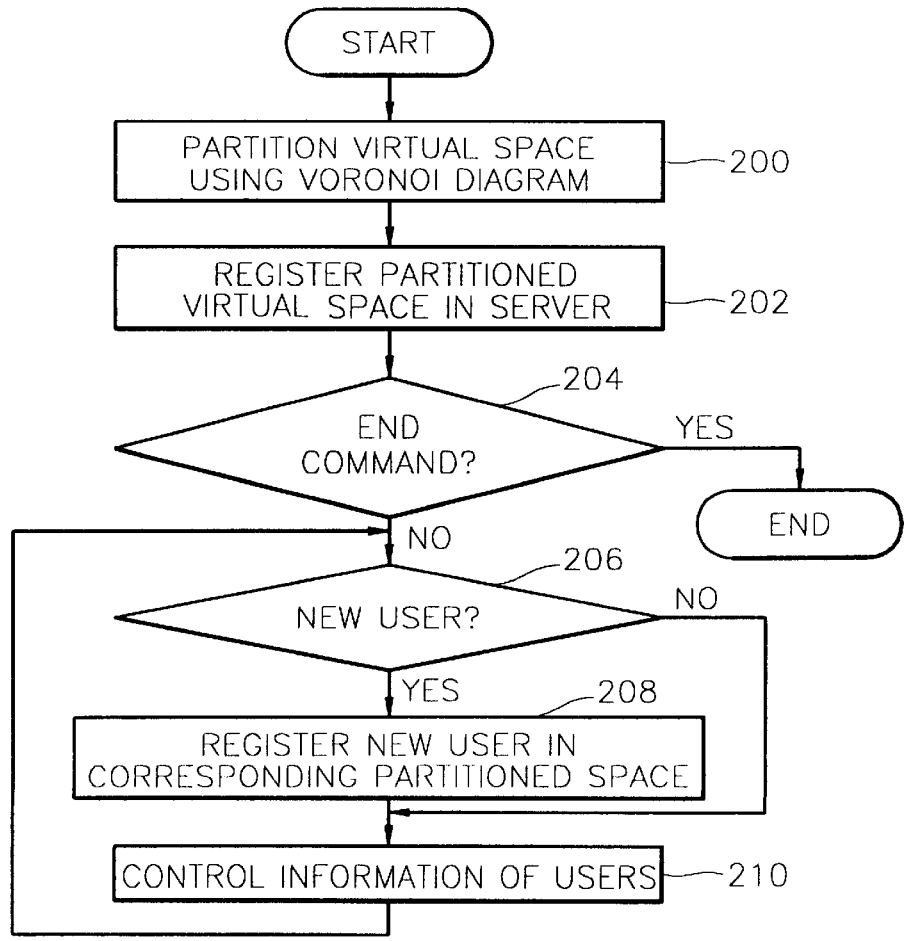
FIG. 2 is a flow chart of a method of controlling users in a multi-user virtual space according to the present invention.

Referring to FIG. 2, a method of controlling users in a multi-user virtual space includes the steps of:

partitioning the virtual space using a Voronoi diagram (step 200);

registering the partitioned virtual space in a server (step 202);

determining whether there is an end server operation command (step 204);

determining whether there is a new user (step 206);

registering a new user in a corresponding partitioned space (step 208) and controlling information of users (step 210).

A three-dimensional virtual space is established and the virtual space is partitioned (step 200). The space is partitioned in the same manner as a Voronoi diagram. In the virtual space, center points of fixed buildings are set as points on the Voronoi diagram. The fixed points are connected to each other, to form dummy lines, the dummy lines are perpendicularly and equally divided, to form vertical lines, and the vertical lines are connected to each other, to partition the space into sub-spaces. The Voronoi diagram shows a plane or a space partitioned by connecting lines, where the partitioned sub-spaces are territories of the points in the space. That is, according to mathematical characteristics, Euclidean distance is the shortest distance between an arbitrary point within a partitioned space and the other points within the same partitioned space.

Figure 3:
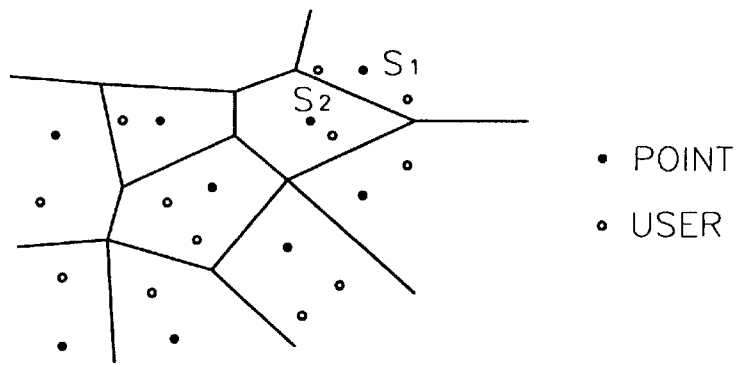
FIG. 3 shows an example of a Voronoi diagram.

Referring to the Voronoi diagram of FIG. 3, points indicating users (○) are closest to points within the corresponding partitioned space among the fixed points (•). S1 and S2 of FIG. 3 represent servers that control the partitioned sub-spaces. More information about the Voronoi diagrams can be found in textbooks such as "Computational Geometry" by Franco P. Preparata and Michael Ian Shamos.

The partitioned virtual space is registered and controlled in the server (step 202). When a command for finishing the operation of the server is input, the operation is finished (step 204). When a command for finishing the operation of the server is not input, a check is made to determine whether there is a new user (step 206). If there is a new user, the Euclidean distance between the position of the new user and the fixed points of the partitioned spaces is calculated, and then the new user is registered in the server controlling the partitioned sub-space nearest the user (step 208). The server retains the position information of the new user, or usual users, in the three-dimensional space, and calculates and manages information on the position, distance, angle and the like, when the user rotates or moves. When the user moves, the position information of the user is shared with other users through a server, and a server in which the moving user takes part, determines whether there are collisions with buildings or other users in order to avoid the collisions (step 210).

When a new user does not exist, it is checked whether there is a new user in the step 206.

Figure 4:
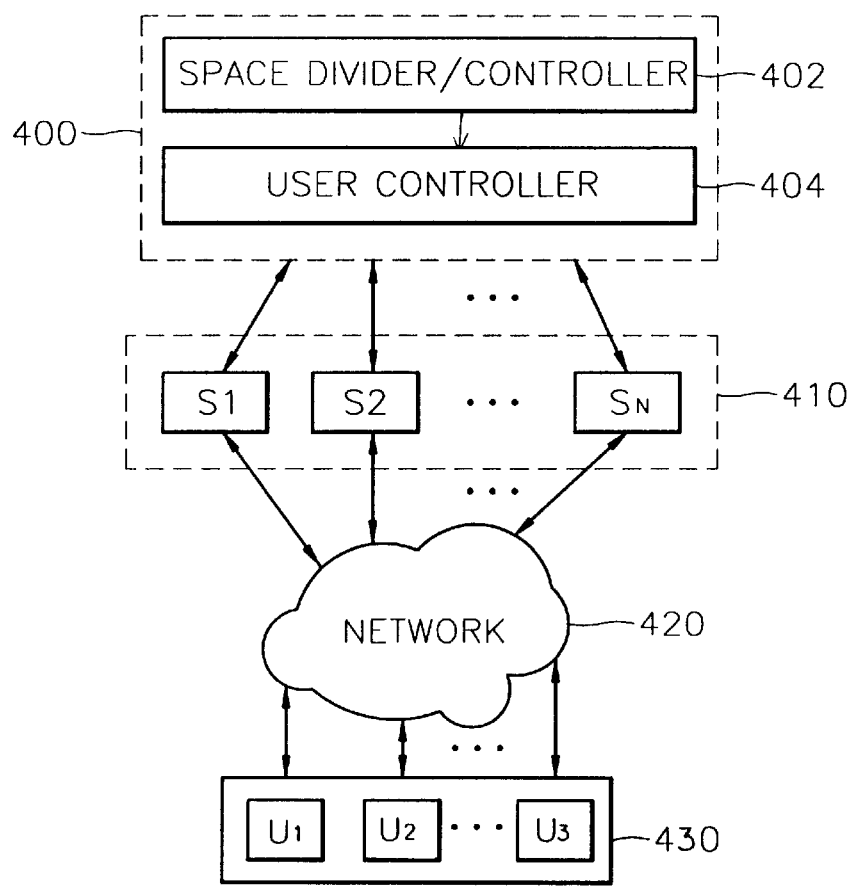
FIG. 4 shows a system of controlling users in a multi-user virtual space according to the present invention.

Referring to FIG. 4, the system of controlling users in a multi-user virtual space includes a host server 400, sub-servers 410 connected to the host server 400, and users 430 connected to the respective sub-servers 410 through a network 420.

The host server 400 includes a space divider/controller 402 for partitioning a three-dimensional virtual space around a fixed point using a Voronoi diagram and controlling the partitioned space and a user controller 404 for distributing new users to the partitioned space and informing other users of the position of new users.

The sub-servers $S_1, S_2, \ldots, S_N$ 410 control the users $U_1, U_2, \ldots, U_N$ 430 in the partitioned sub-spaces, retain information on positions of buildings and users within the space, and determine whether there are collisions between buildings and users and collisions between users when users move. Also, the position information of users and the result of collisions in the partitioned sub-spaces controlled by the sub-servers are shared with the host server 400. The users 430 receive or transmit information of positions, rotation direction and collision check to and from the sub-servers $S_1, S_2, \ldots, S_N$ 410 controlling the corresponding space.

According to the present invention, the three-dimensional virtual space is divided around a fixed point irregularly arranged in the virtual space. A space and a server are distributed to users according to the distance between the fixed point and the user. Therefore, when users move, the amount of calculation for events such as a collision check is reduced and at the same time more users can take part in the system.

What is claimed is:

1. A method of controlling users in a multi-user virtual space comprising:
    a) connecting lines formed by vertically and equally dividing lines obtained by connecting fixed points, which are center points of fixed objects in a three-dimensional virtual space, to partition the space into sub-spaces;
    b) calculating distances between a new user's position and the fixed points of each partitioned sub-space and distributing the new user to the partitioned sub-space corresponding to the shortest distance;
    c) checking and controlling positions, movement and rotation information of each user; and
    d) checking whether there is a new user, and repeating steps b) and c) when there is a new user.

2. The method of claim 1, wherein the distance of the step b) is obtained by a Euclidean distance calculation.

3. A system of controlling users in a multi-user virtual space comprising:
    a host server for partitioning the multi-user virtual space around a fixed point and controlling the partitioned spaces, and calculating distances between the position of a new user and the fixed points, to distribute new user to a sub-space having the shortest distance; and
    a plurality of sub-servers for controlling users taking part in the virtual spaces divided by the host server.

4. The system of claim 3, wherein said host server comprises:
    a space divider/controller for partitioning the multi-user virtual space around a fixed point and controlling the partitioned spaces; and
    a user controller to distribute new user to a sub-space having the shortest distance.

* * * * *